(12) United States Patent
Caelen et al.

(10) Patent No.: US 11,763,137 B2
(45) Date of Patent: Sep. 19, 2023

(54) MACHINE LEARNING SYSTEM FOR VARIOUS COMPUTER APPLICATIONS

(71) Applicant: WORLDLINE, Bezons (FR)

(72) Inventors: Olivier Caelen, Beligique (BE); Liyun He-Guelton, Sathonay-Village (FR); Pierre-Edouard Portier, Villeurbanne (FR); Michael Granitzer, Passau (DE); Konstantin Ziegler, Ergoldsbach (DE); Johannes Jurgovsky, Aufhausen (DE)

(73) Assignee: WORLDLINE, Bezons (FR)

( * ) Notice: Subject to any disclaimer, the term of this patent is extended or adjusted under 35 U.S.C. 154(b) by 542 days.

(21) Appl. No.: 16/632,267

(22) PCT Filed: Jul. 13, 2018

(86) PCT No.: PCT/EP2018/069176
§ 371 (c)(1),
(2) Date: Apr. 10, 2020

(87) PCT Pub. No.: WO2019/016106
PCT Pub. Date: Jan. 24, 2019

(65) Prior Publication Data
US 2020/0257964 A1    Aug. 13, 2020

(30) Foreign Application Priority Data

Jul. 18, 2017 (FR) ...................... 1756823

(51) Int. Cl.
*G06N 3/047* (2023.01)
*G06F 21/31* (2013.01)
*G06N 3/063* (2023.01)

(52) U.S. Cl.
CPC ............. *G06N 3/047* (2023.01); *G06F 21/31* (2013.01); *G06N 3/063* (2013.01)

(58) Field of Classification Search
CPC ....... G06N 3/0472; G06N 3/063; G06F 21/31
See application file for complete search history.

(56) References Cited

U.S. PATENT DOCUMENTS 10,762,423 B2 * 9/2020 Henry ..................... G06N 7/005
2018/0165554 A1 * 6/2018 Zhang .................. G06K 9/6256

OTHER PUBLICATIONS

Wiese et al. (Credit Card Transactions, Fraud Detection, and Machine Learning: Modelling Time with LSTM Recurrent Neural Networks, SCI 247, pp. 231-268. 2009) (Year: 2009).*

(Continued)

*Primary Examiner* — Oleg Korsak
(74) *Attorney, Agent, or Firm* — HAUPTMAN HAM, LLP

(57) ABSTRACT

A machine learning system for various computer applications enabling text mining to detect defects or anomalies in an authentication, operation or transaction carried out by the application comprising:
A hardware and software arrangement forming a preprocessing system;
A hardware and software arrangement forming a neural network leading to an aggregated enriched data processing model,
A hardware and software arrangement for the injection of aggregated enriched data into the neural network,
A hardware and software arrangement to validate the operation or transaction based on the results obtained at the output of the neural network.

6 Claims, 4 Drawing Sheets

(56) References Cited

OTHER PUBLICATIONS

Wiese et al., B., "Credit Card Transactions, Fraud Detection, and Machine Learning: Modelling Time with LSTM Recurrent Neural Networks," Studies in Computational Intelligence, Jan. 1, 2009, vol. 247, pp. 231-268.
Yoshihiro et al., A., "Detecting Fraudulent Behavior Using Recurrent Neural Networks," Computer Security Symposium 2016, Oct. 11, 2016, pp. 805-810.
Carneiro et al., N., "A data mining based system for credit-card fraud detection en e-tail," Decision Support Systems, vol. 95, Jan. 7, 2017, pp. 91-101.
Bahnsen et al., A., "Feature engineering strategies for credit card fraud detection," Expert Systems With Applications, vol. 51, Jan. 7, 2016, pp. 134-142.
Abdallah et al., A., "Fraud detection system: A survey," Journal of Network and Computer Applications, vol. 68, Apr. 13, 2016, pp. 90-113.
Dal Pozzolo et al., A., "Learned lessons in credit card fraud detection from a practitioner perspective," Expert Systems With Applications, vol. 41, No. 10, Aug. 1, 2014, pp. 4915-4928.
International Search Report from corresponding International Application No. PCT/EP2018/069176, dated Nov. 26, 2018, pp. 1-2, European Patent Office, Rijswijk, The Netherlands.
Written Opinion from corresponding International Application No. PCT/EP2018/069176, pp. 1-9, European Patent Office, Rijswijk, The Netherlands.

\* cited by examiner (a) F2F  (b) ECOM

MACHINE LEARNING SYSTEM FOR VARIOUS COMPUTER APPLICATIONS

RELATED APPLICATIONS

The present application is a national phase of international application number pct/ep2018/069176, filed Jul. 13, 2018, and claims priority to French application no. 1756823, filed Jul. 18, 2017.

TECHNICAL FIELD OF THE INVENTION

The invention relates to the field of fraud detection systems during authentication, in particular during an authentication, operation or transaction.

STATE OF THE PRIOR ART

Due to the constantly growing volume of electronic exchange, the various actors are constantly looking for new ways of detecting fraud during authentications, operations or transactions.

With the large amount of data that we see today, traditional human observation does not meet the essential requirements for the establishment of an accurate detection of fraud with the quantity, diversity and dynamic nature of the behaviors malicious.

Systems using modern methods based on data and stand-alone learning methods are beginning to be used to detect defects in computer applications, such as, for example, authentication frauds, in particular those related to the use of credit cards.

To do this, these systems generally use neural networks whose statistical learning is based on decision tree forests (Random Forest Classifier) that analyze a sampling of non-sequential data.

Nevertheless, the use of learning by decision tree can generate very complex decision trees which generalize the training set badly and lead to accept a fraudulent identification that will not be detected.

There is therefore a need for a system which makes it possible to identify anomalies not detected by the neural networks whose statistical learning is based on decision tree forests (Random Forest Classifier).

DISCLOSURE OF THE INVENTION

The object of the present invention is thus to propose a system for detecting fraud during an identification, making it possible to overcome at least some of the disadvantages of the prior art, by proposing a machine learning system for various computer applications enabling text mining to detect defects or anomalies in a authentication, operation or transaction carried out by the application comprising:
  A hardware and software arrangement forming a pre-processing system;
  A hardware and software arrangement forming a neural network leading to an aggregated enriched data processing model,
  A hardware and software arrangement for the injection of aggregated enriched data into the neural network,
  A hardware and software arrangement to validate the operation or transaction based on the results obtained at the output of the neural network.
Advantageously the neural network driving the processing model is:

A recurring neural network of Long Short Term Memory (LSTM) type;
A neural network for statistical learning of the type of decision tree; or
A combination of the two.

Advantageously the recurring neural network of the LSTM type comprises at least two recurring layers and a Logistic Regression Classifier positioned above the last recurrent layer taking into account the time elapsed between two authentication, operation or transactions.

Advantageously the hardware and software arrangement for validating the authentication, operation or transaction is parameterized with a Jaccard Index matrix in order to measure the degree of similarity between the output data of a first neural network of the LSTM type with those originating from a hardware and software arrangement format a second neural network for statistical learning of the type of decision tree and to validate the results of one of the two neural networks.

Advantageously it is used for a computer application allowing the risk prediction from the detection of fraud in the operations of authentication of electronic memory objects containing in a zone Secret information used to authenticate the object and its bearer.

Advantageously the hardware and software arrangement forming a recurring neural network driving an LSTM type model uses a GPU.

Advantageously the hardware and software arrangement forming a pre-processing system comprises:
  At least one first database containing at least one set of sequential patterns of raw data relating to said computer application,
  A hardware and software arrangement forming at least one second database containing at least one set of external data
  A hardware and software arrangement for enriching the raw data by the external data,
  A hardware and software arrangement for aggregating the enriched data.
Advantageously the pre-processing system uses multi-threading.

BRIEF DESCRIPTION OF THE FIGURES

Other characteristics, details and advantages of the invention will become apparent on reading the following description with reference to the accompanying figures, which illustrates.

DETAILED DESCRIPTION OF DIFFERENT EMBODIMENTS OF THE INVENTION

Figure 1:
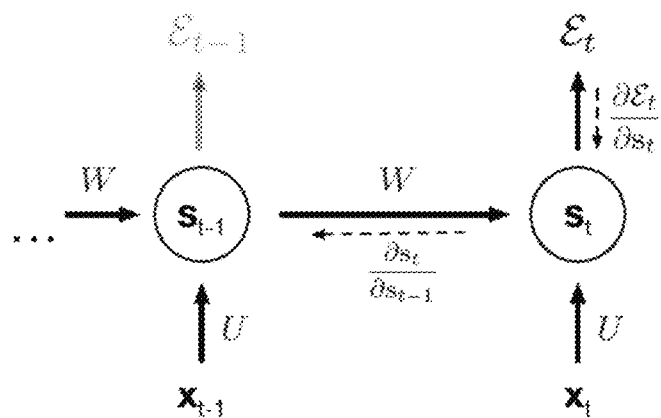
FIG. 1 shows schematic of a recurrent neural network unrolled in time by creating a copy of the model for each time step

The following description is focused on credit card fraud detection application of the system, but can be applied to others frauds, defects or anomalies in an authentication, operation or transaction carried out by various applications running of by an informatics system or network.

Depending on the perspective we take, fraudulent authentications, operations or transactions can be understood as anomalies in the purchase behavior of customers or as a set of outliers in the class of genuine authentications, operations or transactions which on their own form an opposing class of fraudulent transactions. Either way, in feature space frauds very well intermingle with genuine authentications, operations or transactions because of two reasons. First, genuine purchase actions from millions of customers naturally cover a broad spectrum of variability. And secondly, fraudsters apply various inscrutable, yet rational, strategies to execute fraudulent acts that span several customer accounts across varying time periods—but in the end, these acts will likewise only appear as individual authentications, operations or transactions in a dataset. Identical purchase actions can at the same time reflect either completely legitimate behavior in the context of some customers or obvious anomalies in the context of others.

In order support a better discrimination between authentications, operations or transactions that are hard to distinguish, we identified two approaches that enable us to summarize the transaction history of customers and to use this summary during the classification of individual transactions. The first method is a well-established practice in the domain of credit-card fraud detection and it is based on manual feature-engineering. With the second method, we focus on recovering the sequential structure of a customer's authentication, operation or transaction history by modeling the transition dynamics between authentications, operations or transactions with a Recurrent Neural Network.

A Long Short-Term Memory Network (LSTM) is a special variant of a recurrent neural network (RNN). Recurrent neural networks have been developed in the 80s [Williams and Hinton, 1986, Werbos, 1988, Elman, 1990] for modeling time series. The structure of an RNN is similar to that of a standard multilayer perception, with the distinction that it allows connections among hidden units associated with discrete time steps. The time steps index the individual elements in a sequence of inputs. Through the connections across time steps the model can retain information about the past inputs, enabling it to discover temporal correlations between events that are possibly far away from each other in the input sequence. This is a crucial property for proper learning of time series where the occurrence of one event might depend on the presence of several other events further back in time.

A generic neural network, with input $x_t$ and state $s_t$ for time step t is given by equation 1.

$$s_t = W\sigma(s_{t-1}) + Ux_t + b \quad (1)$$

The parameters of the model $\theta = \{W, U, b\}$ are given by the recurrent weight matrix W, the input weight matrix U and the biases b. The initial state $s_0$ is the zero vector and $\sigma$ is some non-linear element-wise activation function— tan h in our case. A cost $\varepsilon$ measures the performance of the network on some given task and it is typically composed of the costs at all time steps $\varepsilon = \Sigma_{1 \leq k \leq t} \varepsilon_k$. Such composite cost would be applicable, for instance, to text labeling tasks, where each input word gets assigned a label. In our case, we only predict the label of the last authentication, operation or transaction in a sequence.

The distribution over classes fraud and non-fraud given state $s_t$ is modeled with a logistic regression output model. We interpret the true label $y_t \in \{0, 1\}$ of an authentication, operation or transaction as the probability of $x_t$ to belong to class 0 or 1 and measure the cost induced by the model's predicted probabilities $\hat{y}_t$ by means of the cross-entropy error, defined as $\varepsilon_t = (x_{1:t}, y_t) = -y_t \log \hat{y}_t - (1-y_t) \log(1-\hat{y}_t)$.

The model parameters $\theta$ are learned by minimizing the cost $\varepsilon_t$ with a gradient based optimization method. One approach that can be used to compute the required gradients is Backpropagation Through Time (BPTT). BPTT works by unrolling a recurrent network in time to represent it as a deep multi-layer network with as many hidden layers as there are time steps (see FIG. 1). Then, the well-known Backpropagation algorithm [Williams and Hinton, 1986] is applied on the unrolled network.

While in principle, the recurrent network is a simple and powerful model, in practice, it is hard to train properly with gradient descent. Among the many reasons why this model is so unwieldy, there are two major problems that have been coined the vanishing and exploding gradient problem [Bengio et al., 1994].

With the recurrent connection between latent states, the parameters $\theta$ affects the error not only through the last but all previous states. Likewise, the error depends on W through all states s. This dependency becomes problematic when we compute the gradient of $\varepsilon_t$ w. r. t. $\theta$:

$$\frac{\partial \varepsilon_t}{\partial \theta} = \sum_{1 \leq k \leq t} \left( \frac{\partial \varepsilon_t}{\partial s_t} \frac{\partial s_t}{\partial s_k} \frac{\partial s_k}{\partial \theta} \right) \quad (2)$$

The Jacobian matrix $$\frac{\partial s_i}{\partial s_k}$$

contains all component-wise interactions between state $s_k$ and state $s_t$. It can be understood as a means to transport back the error from state t to state k. It is given as a product of all pairwise interactions between consecutive states:

$$\frac{\partial s_t}{\partial s_k} = \prod_{t \geq i > k} \frac{\partial s_i}{\partial s_{i-1}} \quad (3)$$

This product is the actual reason why it is so difficult to learn long-term dependencies with gradient-based optimization methods. The longer dependency between t and k, the more factors $$\frac{\partial s_i}{\partial s_{i-1}}$$

get multiplied into $$\frac{\partial s_t}{\partial s_k},$$

causing the norm of the gradient to increase or decrease exponentially with t-k. Each factor $$\frac{\partial s_i}{\partial s_{i-1}}$$

involves both the recurrent weight matrix and the derivative σ'($s_{i-1}$). [Pascanu et al., 2013] showed that it is sufficient for the largest eigenvalue of the recurrent weight matrix to be smaller than 1 for long term components to vanish and necessary for it to be larger than 1 for gradients to explode.

Several solutions exist to attenuate these problems. Using a L1 or L2 penalty on the recurrent weight matrix can ensure that the largest eigenvalue never exceeds 1, given an initialization with sufficiently small weights. Another proposal is based on the assumption that if the model exhibits from the beginning the same kind of asymptotic behavior as the one required by the target, then it's less likely for gradients to explode [Doya, 1993]. However, it is not trivial to initialize a model in this specific regime. Gradient-clipping is another rather practical approach that involves clipping element-wise components of the gradient when they exceed a fixed threshold [Mikolov et al., 2011]. Finally, a solution for avoiding the vanishing gradient problem was proposed by [Hochreiter and Schmidhuber, 1997] by removing the direct dependency on a recurrent weight matrix in $$\frac{\partial s_i}{\partial s_{i-1}}$$

[Bayer, 2015]. This modified network structure is called a Long Short-Term Memory Network (LSTM) and it constitutes the state of the art on many real world tasks such as speech recognition, handwriting recognition and statistical machine translation.

As an alternative to modeling authentication, operation or transaction sequences with an LSTM, we employ traditional feature engineering.

Feature Aggregations: One way to extract information from an authentication, operation or transaction sequence is to aggregate the values of certain variables along the sequence. To construct such feature aggregations, we follow the procedure that was recently proposed by [Bahnsen et al., 2016]. This simple and yet powerful procedure can be considered the state of the art of feature engineering in credit-card fraud detection. To each authentication, operation or transaction they add new features according to some pre-defined rules. The value of a new feature is computed with an aggregation function applied to a subset of the preceding transactions. The goal is to create an activity record from the authentication, operation or transaction history of a card-holder which quantifies the degree to which the current authentication, operation or transaction complies with previous ones.

Let $(x_t) t \in \mathbb{N}$ be the temporally ordered sequence of authentications, operations or transactions of a single card-holder, where t indexes the individual authentications, operations or transactions in her sequence. We denote the value of a particular variable in an authentication, operation or transaction by superscript: e. g. $x_t^{(Amt)}$ is the amount spent in authentication, operation or transaction $x_t$. Based on a single authentication, operation or transaction $x_k$, we select a subset of authentications, operations or transactions from the past up to a maximal time horizon $t_h$ and according to some categorical variables A and B:

$$S_k = agg(\{x_t\}, k, A, B, t_h) \quad (4)$$
$$= \{x_i \mid (x_i^{(A)} = x_k^{(A)}) \wedge (x_i^{(B)} = x_k^{(B)}) \wedge (\text{hours}(x_i^{(Time)}, x_k^{(Time)}) < t_h)\}_{i<k}$$

The set $S_k$ contains all authentications, operations or transactions from the previous $t_h$ hours before $x_k$, where the categorical variables A and B took the same values as in $x_k$. The categorical variables A and B and the time horizon $t_h$ can be seen as constraints imposed on the subset. For instance, if we define A:=Country, B:=MCC and $t_h$=24, the subset $S_k$ contains all authentications, operations or transactions from the past 24 hours which were issued in the same country and in the same merchant category as authentication, operation or transaction $x_k$.

Now we can define aggregation functions on $S_k$. There are many possibilities to define such functions and even though all of them might be equally valid, we restrict ourselves to the two functions that were proposed by the authors: The total amount spent and the number of transactions.

$$\text{sum}_{S_k} = \sum_{x \in S_k} x^{(Amt)} \quad (5)$$

$$\text{count}_{S_k} = |S_k| \quad (6)$$

The pair (sums, counts) corresponds to a single constraint given by A, B and $t_h$. In order to cover a broader range of statistics from the authentication, operation or transaction history, we compute such pairs for all combinations of the categorical variables country, merchant category and card entry mode within a time horizon of 24 hours. Finally, we append all these pairs to the feature vector of authentication, operation or transaction $x_k$.

Time Delta: A sequence learner detects patterns in sequences of consecutive transactions. We suppose these patterns resemble some form of latent purchase behavior of card-holders. If so, the behavioral patterns should be invariant to the concrete points in time when the purchase actions were actually taken. To support a time normalization on input sequences that span very different time periods, we extract the time between two consecutive authentications, operations or transactions in minutes and add it explicitly as additional feature:

$$\text{tdelta}_i = x_i^{(Time)} - x_{i-1}^{(Time)}$$

As in any statistical modeling task, we can observe the true phenomena in the real world only through a proxy given as a finite set of point-wise observations.

In credit-card fraud detection, the true phenomenon of interest is the genuine purchase behavior of card holders or, likewise, the malicious behavior of fraudsters. Our assumption is that this object, which we loosely term the behavior, is controlled by some latent, yet consistent, qualities. With its state variables, the LSTM is in principle capable of identifying these qualities from the sequence of observations.

In the real world, societal conventions, official regulations or plain physics impose constraints on the potential variability of observations and thereby on the complexity of the qualities that control them. For instance, opening hours strictly limit when and where customers are able to purchase their goods or services. Geographical distances and traveling modalities restrict the possibilities of consecutive transactions. We can expect that all the face-to-face authentications, operations or transactions we see in our dataset respect, to some degree, these real world constraints. In contrast, e-commerce authentications, operations or transactions or rather their corresponding online purchases are widely unconstrained, according to both time and place. There is hardly any attribute that could not genuinely change in arbitrary ways from one authentication, operation or transaction to the next.

We hypothesize that the presence of real-world constraints in face-to-face transactions gives rise to more obvious behavioral patterns with less variation. In that case, a sequence learner should benefit from the more consistent sequential structure.

Motivated by preceding statistical analyses and considerations regarding real-world purchase behavior, we decided to study the impact of a sequence learner on the detection accuracy on e-commerce and face-to-face authentications, operations or transactions separately. We contrast the results with a non-sequence learner, a Random Forest classifier.

Based on a labeled credit-card authentication, operation or transaction dataset recorded from March to May 2015, we create datasets in the following way: We group all authentications, operations or transactions by card holder ID and sort the authentications, operations or transactions of each card holder by time. As a result, we obtain a temporally ordered sequence of authentications, operations or transactions for each card holder. In the remainder of this work, we denote such sequence as the account of a card holder and the whole set of all accounts as the sequence dataset. We further split the sequence dataset into two mutually exclusive sets: One sequence dataset contains only e-commerce authentications, operations or transactions (ECOM) and the other only point-of-sale authentications, operations or transactions (F2F).

TABLE 1

Dataset sizes and fraud ratios.

| | Training set (01.03.-25.04.) | | Validation set (26.04.-30.04.) | | Test set (08.05.-31.05.) | |
|---|---|---|---|---|---|---|
| ECOM | $2.9 \cdot 10^6$ | 1.48% | $0.6 \cdot 10^6$ | 0.38% | $3.3 \cdot 10^6$ | 0.42% |
| F2F | $4.3 \cdot 10^6$ | 0.81% | $0.7 \cdot 10^6$ | 0.07% | $4.7 \cdot 10^6$ | 0.05% |

Account sampling: A typical particularity of fraud detection problems is the high imbalance between the minority class (fraudulent transactions) and the majority class (genuine transactions). The overall fraction of fraudulent authentications, operations or transactions usually amounts to about 0.5% or less. In the F2F-dataset, frauds occur less frequently by one order of magnitude as compared to the ECOM-dataset, which further aggravates the detection problem. Studies from literature [Bhattacharyya et al., 2011] and previous experiments showed that some form of majority class undersampling on the training set improves the learning. However, in contrast to transaction-based datasets in which authentications, operations or transactions are considered as independent training examples, we cannot directly apply such undersampling strategy to a sequence dataset. Therefore, we employed undersampling on account level. In this regard, an account is considered compromised if it contains at least one fraudulent authentication, operation or transaction and it is considered genuine if it contains only genuine transactions. We employed a simple account-based sampling process to build the training set. With probability $p_g=0.9$ we randomly picked an account from the set of genuine accounts and with probability $1-p_g$ we picked an account from the set of compromised accounts. This process is repeated $10^6$ times to create a training set with one million accounts. The de facto fraud ratio on transaction-level is still smaller than 1:10 but we found that this simple approach works well in practice. See Table 1 for details regarding dataset sizes and time periods.

Delayed ground truth: Our test period starts more than one week after the training period. The reason for this decision is two-fold: In a production system, labels for authentications, operations or transactions are only available after human investigators have reviewed the transactions. Therefore, the availability of an accurate ground truth is always delayed by about one week. The second reason is that classification is typically more accurate on recent authentications, operations or transactions that follow closely upon the training period. But such accuracy would be an overly optimistic appraisal of the classifier's performance in a production system, since in practice, we would not yet have access to the true labels.

Dataset alignment: Both the Random Forest and the LSTM were trained to predict the label of individual transactions. However, there is one difference that we need to take into account in the experiments. With an LSTM we can only predict the label of a authentication, operation or transaction after having seen several authentications, operations or transactions that precede it, whereas with the Random Forest we do not require any preceding transactions. To improve the comparability of the results, we accounted for this difference by removing all authentications, operations or transactions that were not preceded by at least w=9 preceding transactions. The RF and LSTM can now be trained, validated and tested on identical sets of transactions. To study the influence of the length of the input sequence on the LSTM predictions, we kept either only 4 (SHORT) or all 9 preceding authentications, operations or transactions (LONG) as input.

Since the data collected during a credit-card authentication, operation or transaction must comply with international financial reporting standards, the set of raw features is quite similar throughout the literature. We, therefore, removed all business-specific features and kept only those that are commonly used in other studies [Bhattacharyya et al., 2011, Bahnsen et al., 2016, Carneiro et al., 2017]. In order to assess the impact of additional features on the classification accuracy, we defined three feature sets.

Our first feature set (BASE) contains all raw features after removing the business-specific variables. Since frauds usually do not appear in isolation but rather as elements of entire fraud sequences that may span several hours or days, we removed the card holder ID from the feature set. Otherwise a classifier could simply remember the IDs of card holders with compromised accounts and take decisions only in this much smaller set of transactions. However, in practice we would rather like to know whether there is a fraudulent authentication, operation or transaction and then render the account compromised. The second feature set (TDELTA)

contains all features from the BASE set plus the time delta feature as described in section 3.2. The third feature set (AGG) contains all features from the TDELTA set plus 14 aggregated features as described above. We aggregated authentications, operations or transactions from the previous 24 hours in terms of the amount and the number of authentications, operations or transactions based on all combinations of the categorical variables term-mcc, term-country and card-entry-mode. See table 2 for an overview of the features.

TABLE 2

List of features in our datasets. Features marked with (*) are composite features composed of several lower-level features.

| Feature | Type |
|---|---|
| TERM-MCC | categorical |
| TERM-COUNTRY | categorical |
| TX-AMOUNT | ratio |
| TX-DATETIME (*) | categorical |
| TX-3D-SECURE | categorical |
| TX-EMV | categorical |
| TX-LOCAL-CURRENCY | categorical |
| TX-LOCAL-AMOUNT | ratio |
| TX-PROCESS | categorical |
| TX-CARD-ENTRY-MODE | categorical |
| BROKER | categorical |
| CARD-BRAND | categorical |
| CARD-EXPIRY | categorical |
| CARD-TYPE | categorical |
| CREDIT-LIMIT | ratio |
| CARD-AUTHENTICATION | categorical |
| TDELTA | ratio |
| AGGREGATIONS (*) | ratio |

Ratio-scaled variables: We applied gaussian normalization to ratio-scaled variables such as the authentication, operation or transaction amount or credit limit to center the variable on $\mu=0$ with a standard deviation $\sigma=1$. This normalization has no effect on the learning of a Random Forest classifier, but it accelerates the convergence of gradient-based optimization in Neural Networks.

Categorical variables: In case of the Random Forest classifier, categorical variables can be used just as-is. We only mapped each value to an integer number. In case of neural networks, we wanted to avoid having very high-dimensional one-hot encoded feature vectors. Therefore, we employed a label encoding mechanism which is quite popular in the domain of natural language processing and neural networks Collobert et al. [2011], Socher et al. [2013], Tang et al. [2014] and is applicable to arbitrary other categorical variables apart from words [Guo and Berkhahn, 2016]. For a categorical variable with its set of values C, we assigned each value a random d-dimensional weight vector v, that was drawn from a multivariate uniform distribution $$v \sim u([-0.05, 0.05]^d), \text{ with } d=\lceil \log_2(|C|) \rceil$$

The feature values and their corresponding vectors (vector embeddings of the feature values) are stored inside a dictionary. To encode a particular value of the categorical variable, we look up the value of the feature in the dictionary and retrieve its vector. The embedding vectors are part of the model's parameters and can be adjusted jointly during parameter estimation.

Time feature: We considered the time feature as a composition of several categorical variables. For each temporal resolution of the time feature, i.e. year, month, weekday, day, hour, minute and second, we defined a categorical variable in the same way as described above.

The Long Short-term Memory network had two recurrent layers and a Logistic Regression classifier stacked on top of the last layer. The Logistic Regression classifier can be trained jointly with the LSTM state transition model via error backpropagation. We applied dropout [Srivastava et al., 2014] to the LSTM nodes to regularize the parameters and trained the entire model by minimizing the cross-entropy between the predicted and the true class distribution with the ADAM algorithm. Our implementation is based on the deep learning library Keras.

Since we are studying potential benefits of a LSTM-based sequence learning approach over a static learner, we had to pick one instance from the class of static learners. Here, we chose to compare against Random Forests. In previous experiments we observed that Random Forests are a strong baseline on this task which also explains its widespread usage for fraud detection [Carneiro et al., 2017, Bahnsen et al., 2016, Ngai et al., 2011]. We used the Random Forests implementation from SciKit-Learn Grid search: Both the Random Forest and the LSTM must be parameterized with hyper-parameters. We searched the space of possible hyper-parameter configurations in terms of a coarse grid spanned by a subset of all hyper-parameters (see Table 3). We then selected the configuration with the maximal $AUCPR_{0.2}$ on the validation set.

TABLE 3

Hyper-parameters considered during grid search.

| RF | | LSTM | |
|---|---|---|---|
| min-sample-leaf | {1, 3, 10} | learning-rate | {$10^{-2}, 10^{-3}, 10^{-4}$} |
| splitting-criterion | {gini, entropy} | dropout | {0.2, 0.5, 0.8} |
| max-features | {5, 10} | nodes (per layer) | {20, 100} |
| trees | {100, 600} | | |

Two criteria guided the selection of suitable performance metrics: Robustness against imbalanced classes and attention to business-specific interests.

AUCPR: We employed the precision-recall (PR) curve and in particular the area under that curve to quantify the detection accuracy. Each point on the PR-curve corresponds to the precision of the classifier at a specific level of recall. The full curve therefore provides a complete picture of a classifier's accuracy and it is robust even in imbalanced settings. The integral over that curve yields a single-valued summary of the performance and we denote it as AUCPR.

AUCPR@0.2: From a business point-of-view, low recall and high precision is preferable over high recall and low precision. A typical choice is therefore to measure the precision on the first K elements in the ranked result list. Such precision at K corresponds to one single point on the PR-curve and it is prone to variability due to different choices for K. In order to reflect business interests and to circumvent the variability issue, we suggest to use the integral over the PR-curve computed up to a certain recall level (0.2 in our experiments). The maximum value of AUCP R@0.2 is 0.2.

Jaccard Index: To explore qualitative-differences between our two approaches, we used the Jaccard Index to measure the degree to which two classifiers are similar in terms of the frauds they detect. Given two result sets (true positives) A and B, the Jaccard Index is defined as $$\mathcal{J}(A, B) = \frac{|A \cap B|}{|A \cup B|}.$$

The decision threshold was set s.t. it corresponds to a recall of 0.2.

Savings: Savings is another metric that is often used in the domain of credit-card fraud detection. It measures the monetary benefit of some algorithm over a trivial acceptor/rejector and it is based on a pre-defined cost matrix. A test of a binary classifier on a single authentication, operation or transaction can have four possible outcomes defined by the two predictions (p=0 or p=1) and the two true judgments (y=0 or y=1). To each of these outcomes one can associate a monetary cost induced by an investigation process that accepts p as decision in the light of the true label y. Table 4 displays the cost matrix.

TABLE 4

Cost matrix

|  | y = 1 | y = 0 |
|---|---|---|
| p = 1 | $C_p + C_{cb}$ | $C_p$ |
| p = 0 | $g(x_i)$ | 0 |

The individual entries are composed of a processing cost $C_p$, a charge back $C_{cb}$ and a transaction-dependent cost $g(\cdot)$. g represents the money lost due to frauds happening while the investigation process is ongoing. It is defined as:

$$g(x_i) = \sum_{v \in \mathcal{F}_i} v^{(Amt)} \quad (8)$$

Where $F_i$ is the set of fraudulent authentications, operations or transactions that occur up to T hours after authentication, operation or transaction $x_i$:

$$F_i = \{x_j | \text{hours}(x_j^{(Time)}, x_i^{(Time)}) < T \wedge x_j^{(Fraud)} = 1\}_{j=i}^{N} \quad (9)$$

Due to business regulations, we can not provide details on the particular values of $C_p$, $C_{cb}$ and T. However, we want to state clearly that outside a particular business context, there is no reason to report classification performance of statistical models in terms of monetary savings. This measure entirely depends on the cost matrix. We included this metric solely because we found it to be used commonly in related work. In contrast, the AUCPR should be the metric of choice for comparisons between different classification methods. It is objective and thus allows for more general conclusions that also hold outside of a particular business context.

We trained a model for each combination of feature set, data set and sequence length and then tested its classification performance on the held-out test set. In case of Random Forests, the length of the input sequence has no influence on the model since only the last authentication, operation or transaction from the input sequence was used. We evaluated the trained models on each of the 24 test days individually and report their mean performance with respect to the metrics defined above.

Table 5 and Table 6 show a summary of the results for the Face-To-Face and E-Commerce datasets. A first observation is, that the overall detection accuracy is much higher on ECOM than on F2F, which can be explained by the higher fraud ratio in ECOM. Secondly, longer input sequences seem to have no effect on the detection accuracy, neither for F2F nor for ECOM. Third, taking into account previous authentications, operations or transactions with an LSTM noticeably improves fraud detection on F2F. However, such improvement is not observable on ECOM—rather are the results from the static learning and the sequence learning approach surprisingly similar.

TABLE 5

Mean AUC across all test days. Sequence lengths (SHORT, LONG) and feature sets (BASE, TDELTA, AGG).

| | | F2F | | | | | |
|---|---|---|---|---|---|---|---|
| | | AUCPR (μ) | | AUCPR$_{0.2}$(μ) | | Savings [%] | |
| | Features | RF | LSTM | RF | LSTM | RF | LSTM |
| SHORT | BASE | 0.138 | 0.200 | 0.086 | 0.107 | 23.52% | 22.26% |
| | TDELTA | 0.170 | 0.231 | 0.095 | 0.118 | 26.80% | 21.45% |
| | AGG | 0.241 | 0.246 | 0.112 | 0.113 | 23.93% | 18.71% |
| LONG | BASE | 0.135 | 0.229 | 0.084 | 0.106 | 23.17% | 19.05% |
| | TDELTA | 0.172 | 0.217 | 0.095 | 0.102 | 27.02% | 19.19% |
| | AGG | 0.242 | 0.236 | 0.112 | 0.110 | 23.60% | 24.96% |

TABLE 6

Mean AUC across all test days. Sequence lengths (SHORT, LONG) and feature sets (BASE, TDELTA, AGG).

| | | ECOM | | | | | |
|---|---|---|---|---|---|---|---|
| | | AUCPR (μ) | | AUCPR$_{0.2}$(μ) | | Savings [%] | |
| | Features | RF | LSTM | RF | LSTM | RF | LSTM |
| SHORT | BASE | 0.179 | 0.180 | 0.102 | 0.099 | 7.13% | 18.82% |
| | TDELTA | 0.236 | 0.192 | 0.124 | 0.107 | 9.02% | 15.30% |
| | AGG | 0.394 | 0.380 | 0.158 | 0.157 | 39.58% | 45.00% |
| LONG | BASE | 0.179 | 0.178 | 0.101 | 0.104 | 7.60% | 15.04% |
| | TDELTA | 0.228 | 0.238 | 0.118 | 0.115 | 10.77% | 18.51% |
| | AGG | 0.404 | 0.402 | 0.158 | 0.160 | 38.73% | 42.93% |

Another observation confirms the finding that feature aggregations improve fraud detection. Their impact is much more evident on ECOM as it is on F2F. The observation that feature aggregations help in cases where the sequence model doesn't, suggests that these two forms of context representation are not correlated and that the approaches are complementary. Whatever information LSTM-states are tracking in the authentication, operation or transaction history, it is not the same as what we manually added through aggregations.

Figure 2:
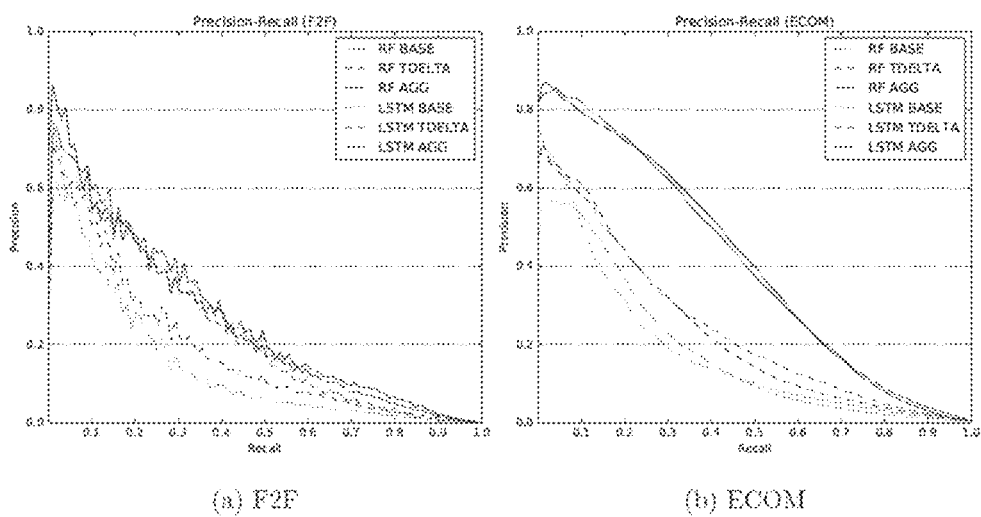
FIG. 2 shows Precision-Recall curves averaged over all days in the test set (Figure shows the results of the LSTM on LONG sequences)

Apparently, an LSTM improves fraud detection on face-to-face authentications, operations or transactions in terms of AUCPR. We were curious where this improvement is coming from. FIG. 2 displays the precision-recall curves of all model variants. In FIG. 2a we can see, that the PR-curves of RF models have a high peak in precision at low recall levels but decay quickly as the recall increases. In contrast, the LSTM models have a slightly lower precision for low recall levels but retain a higher precision as the recall increases. However, there is one interesting exception: Once we add aggregated features, the PR-curve of the Random Forest increases by a noticeable margin up to a performance that is on par with the LSTM models. We cannot at all observe such a clear gain for LSTMs. On e-commerce authentications, operations or transactions (see FIG. 2b), the PR-curves of Random Forest and LSTM are almost identical across all feature sets. RF and LSTM benefit from aggregated features by the same margin.

Figure 3:
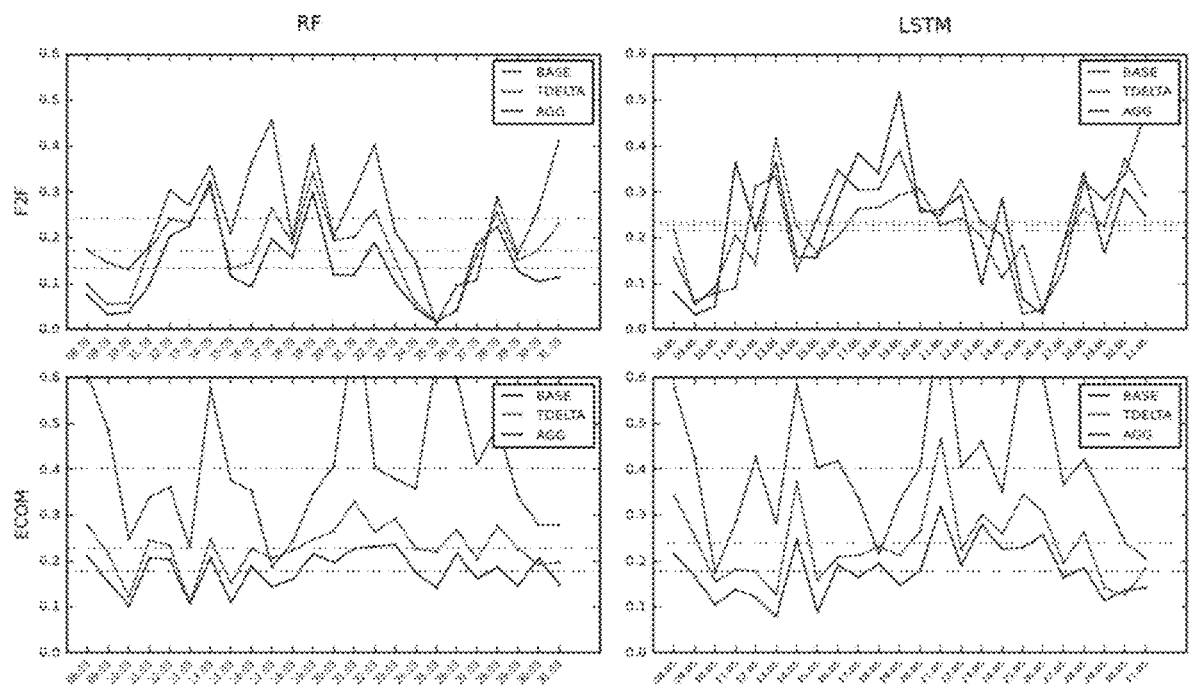
FIG. 3 shows Evolution of AUCPR over all test days. Horizontal dashed lines indicate the mean AUCPR for each curve (Figure shows results of the LSTM on LONG sequences)

In Tables 5 and 6 we reported the mean statistics over all test days. When we plot the AUCPRs of RF and LSTM for individual test days, we can see in FIG. 3 that the predictions from both classifiers exhibit large variations across days. However, since the curves are correlated, we can infer that on some days the detection problem is more difficult than on others. For instance, both classifiers have their minimum w.r.t. the AUCPR in the time periods 9.05.-10.05. and 25.05.-26.05. Through manual inspection, we tried to link authentications, operations or transactions from these days to calendric or public events, but we could not find a satisfying explanation for the poor performance.

Figure 4:
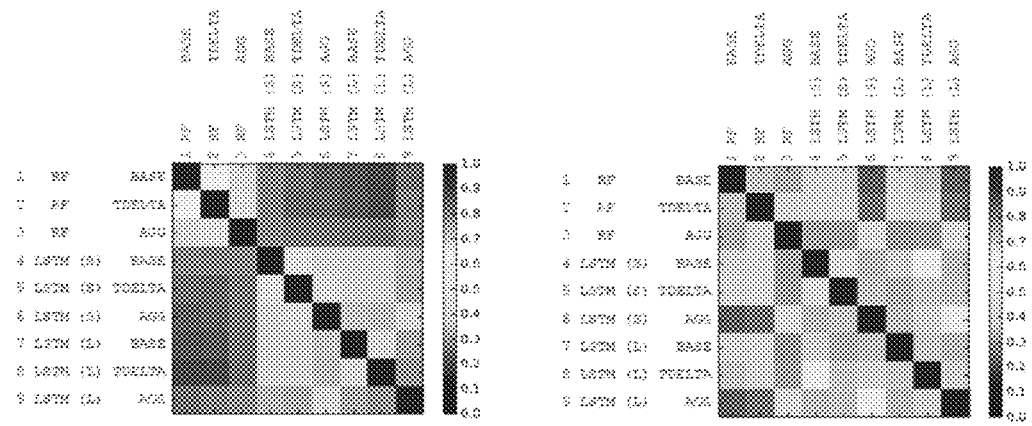
FIG. 4 shows Pairwise comparison of the sets of true-positives of two models measured with the Jaccard Index and color-coded in a heatmap.
Figure 5:
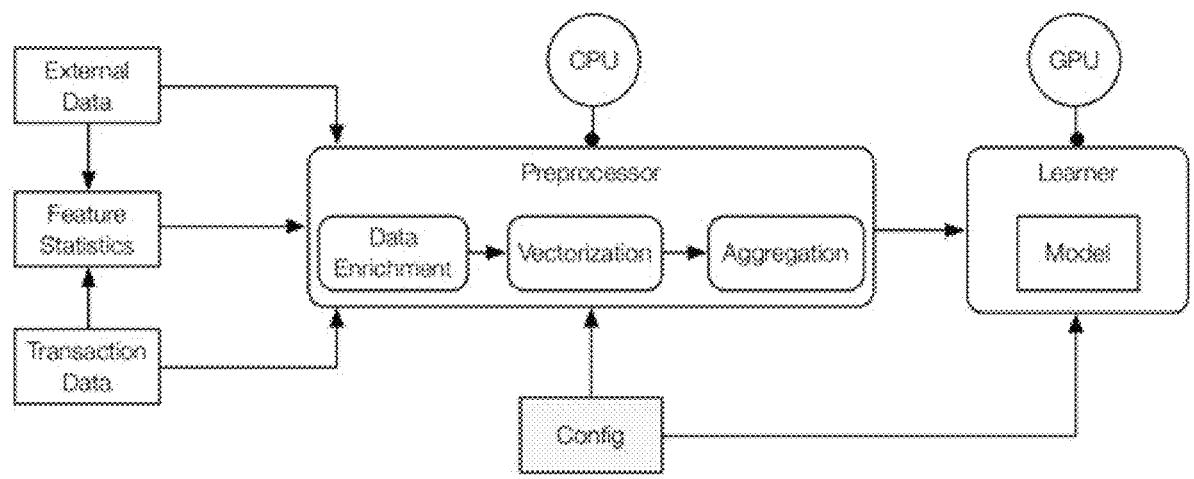
FIG. 5 shows the drive architecture of an LSTM model

In this analysis we had a closer look at the frauds we detected with RF and LSTM. From the set of all trained models, we picked a pair of models and compared their predictions. The decision threshold was again chosen such that it corresponded to a recall level of 0.2. All predictions with a score higher than the threshold were considered as positive predictions and all others as negative predictions. By fixing the recall, we ensured to have an equal number of true-positives in the result sets of a pair of models. However, we were interested in whether the true-positives of the RF are actually identical to the ones of the LSTM. We measured the overlap of the true-positive sets of a pair of models with the Jaccard Index. FIG. 4 displays all pairwise comparisons as a heatmap.

On both heatmaps, we observe four quite distinct areas. The two areas that correspond to intra-model comparisons and the two areas that correspond to inter-model comparisons[4]. The Jaccard Indices suggests that both the RF and LSTM are consistent in the frauds they detect. This property is slightly more pronounced in the Random Forest comparisons. The central and intriguing observation, however, is the fact that RF and LSTM tend to detect different frauds. On F2F, RF models agree on 50.8% of their true-positives on average and LSTM models on 37.8%. Between the two model classes we observe an average agreement of only 25.2%. This is similar on ECOM with average intra-model agreements of 47.5% (RF) and 50.8% (LSTM) and an average inter-model agreement of only 35.0%.

There is one exception to this general observation. The models that were trained with aggregated features tend to detect a common unique set of frauds that were neither detected by Random Forests nor LSTMs without aggregated features. This property is much more pronounced on ECOM than on F2F.

During our experiments we found that the application of Long Short-Term Memory Networks to such structured data is not as straight-forward as one might think. Therefore, we would like to share some observations that might be useful for practitioners.

Model regularization: When we are dealing with a temporal process for which we aim to forecast some properties of future events, no collection of historic data points can truly fulfill the requirements one would demand from a representative validation set. The prediction accuracy on day's right after the end of the training set is better than on days further into the future, suggesting a time-dependency of the conditional distribution. When we choose the days right after the training period as validation set, the results on this set would suggest a small regularization on the model. But this choice has the contrary effect on the performance on days further into the future. An exact and highly-confident model of today's data is probably badly wrong in a few days, whereas a less confident model of today is still valid in a few days. This is less of a concern for ensemble classifiers such as Random Forests, but it is for Neural Networks. A neat work-around is to use Dropout on the network structure. It samples smaller networks from the complete structure, trains these independently and finally averages the hypotheses of these smaller networks. Predictions based on this averaged hypothesis are more stable across time.

Online learning: Stochastic gradient descent and the many variants that have been developed for training Neural Networks (ADAM, RMSprop, Adagrad), are capable of iteratively updating the model even from imprecise errors that have been estimated on small sets of training examples. This property blends in well with the requirement of businesses to keep their detection models up-to-date with the incoming stream of authentication, operation or transaction data.

Remarks on LSTM training: Due to its recurrent structure, the LSTM is prone to overfitting even when the LSTM-layers have only few nodes. Therefore, it's recommendable to start off with a rather small structure and carefully increase the size as long as there is reason to expect further generalization performance. We noticed, that a $l_2$-penalty leads to much smoother convergence and consistently better optima than a $l_1$-penalty. The ADAM optimizer worked much better than a vanilla SGD in our experiments since it estimates a proper learning rate schedule on the go.

Combined approach: Qualitatively, one difference between Random Forests and LSTMs remains even after adding aggregated features. On face-to-face transactions, the LSTM detects a different set of frauds than the Random Forest. Consistently more different than within the individual families. We conjecture, that this difference can be explained by the presence of more distinct succession patterns which are guided and framed by constraints in the real-world. Therefore, in the F2F-scenario, the combination of a sequence learner with a static learner and aggregated features is likely to further improve the detection accuracy.

Figure 6:
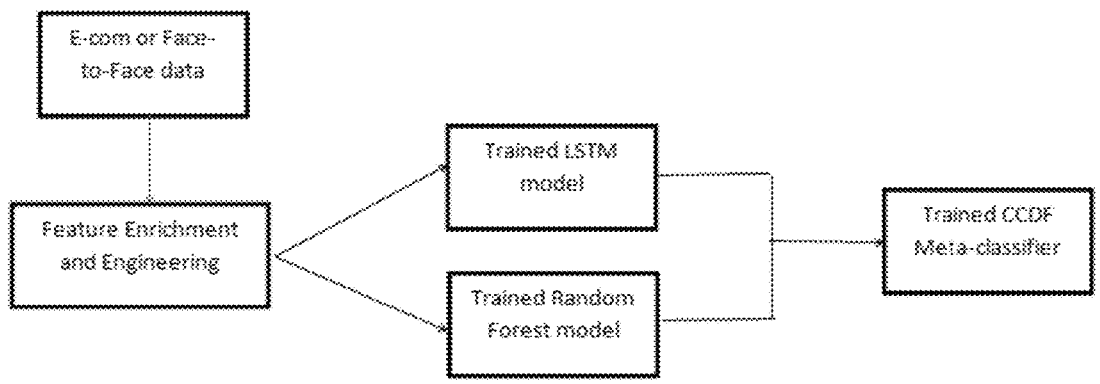
FIG. 6 show a meta-classifier which combine the LSTM model and Random Forest model FIG. 7. shows a fraud detection framework according to the invention
Figure 7:
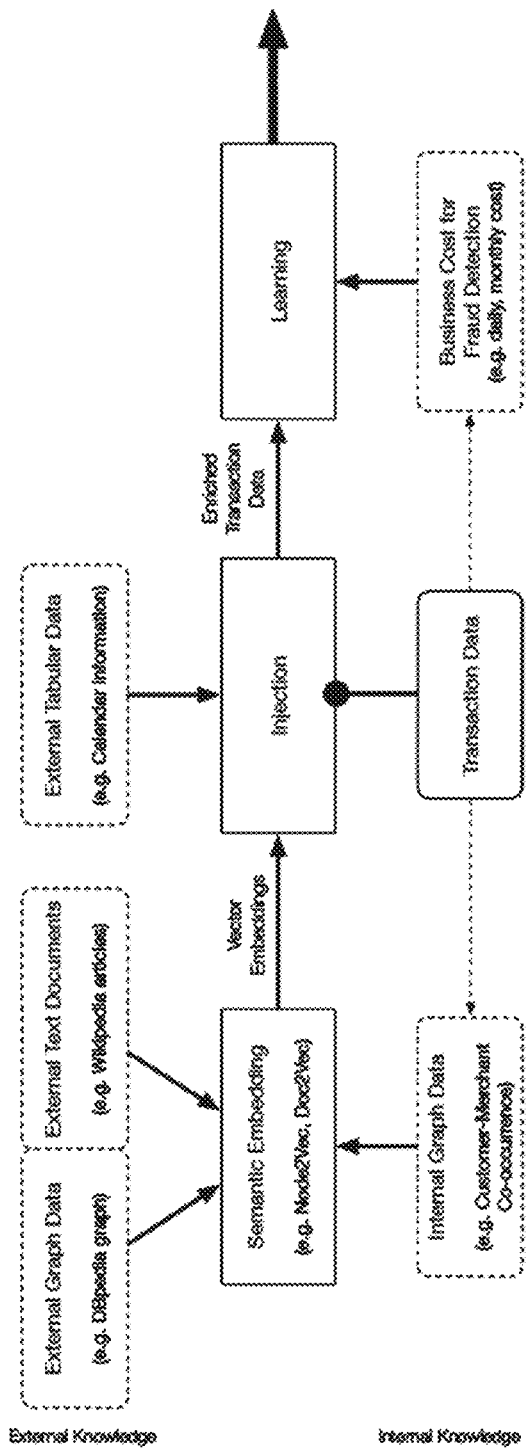

Following the type of application, or the type of frauds, defects or anomalies in an authentication, operation or transaction than the operator want to detect, the system can use only the recurring neural network of Long Short Term Memory (LSTM) type, or the neural network for statistical learning of the type of decision tree or a combination of the two (see FIG. 6).

It will be readily understood on reading the present application that the features of the present invention, as generally described and illustrated in the figures, can be arranged and designed in a wide variety of different configurations. Thus, the description of the present invention and the accompanying figures are not intended to limit the scope of the invention but merely represent selected embodiments.

The person skilled in the art will understand that the technical characteristics of a given embodiment can in fact be combined with features of another embodiment unless the inverse is explicitly mentioned or it is evident that these characteristics are incompatible. Furthermore, the technical characteristics described in one embodiment can be isolated from the other features of this mode unless the inverse is explicitly mentioned.

It should be apparent to those skilled in the art that the present invention allows embodiments in many other specific forms without departing from the scope defined by the protection sought, Illustration and the invention should not be limited to the details given above.

The invention claimed is:

1. A machine learning system for various computer applications enabling text mining to detect defects or anomalies in an authentication, transaction or operation carried out by the application, the system comprising:
   a hardware and software arrangement forming a pre-processing system configured to generate aggregated enriched data by using an aggregation function to compute and add a value to each one of a temporally ordered sequence of authentications, operations, or transactions by quantifying a degree to which the corresponding authentication, operation, or transaction complies with previous ones of the temporally ordered sequence of authentications, operations, or transactions:
- a hardware and software arrangement forming a recurrent neural network of a long short-term memory (LSTM) type, alone or in combination with an algorithm for statistical learning of a decision tree type, and leading to a processing model of the aggregated enriched data from the pre-processing system;
- a hardware and software arrangement configured to inject the aggregated enriched data from the pre-processing system into the recurrent neural network; and
- a hardware and software arrangement configured to validate an authentication, operation or transaction of the sequence of authentications, operations, or transactions based on results obtained at an output of the recurrent neural network;
- wherein the recurrent neural network of the LSTM type comprises at least two recurring layers and a Logistic Regression Classifier positioned above the last recurrent layer, the Logistic Regression Classifier being configured to take into account a time elapsed between two authentications, operations or transactions of the sequence of authentications, operations, or transactions.

2. The system of claim 1, wherein the hardware and software arrangement configured to validate the authentication, operation or transaction of the sequence of authentications, operations, or transactions is parameterized with a Jaccard Index matrix configured to measure a degree of similarity between output data of a first neural network of the LSTM type with output data originating from a hardware and software arrangement forming a second neural network for statistical learning of the type of decision tree, and to validate the results of one of the two neural networks.

3. The system of claim 1, wherein the system is configured to operate as a computer application allowing risk prediction from detection of fraud in operations of authentication of electronic memory objects containing in a zone Secret information used to authenticate the object and its bearer.

4. The system of claim 1, wherein the hardware and software arrangement forming a recurrent neural network of the LSTM type comprises a GPU.

5. The system of claim 1, wherein the hardware and software arrangement forming a pre-processing system comprises:
- at least one first database containing at least one set of sequential patterns of raw data relating to said computer application and comprising the temporally ordered sequence of authentications, operations, or transactions,
- a hardware and software arrangement forming at least one second database containing at least one set of external data
- a hardware and software arrangement configured to enrich the raw data by using the external data, and
- a hardware and software arrangement configured to aggregate the enriched data.

6. The system of claim 1, wherein the pre-processing system is configured to use multi-threading.

* * * * *